United States Patent [19]
Bernard

[11] Patent Number: 5,700,056
[45] Date of Patent: Dec. 23, 1997

[54] SECURABLE LOCKING DEVICE FOR A MOVABLE ELEMENT OF AN AUTOMOBILE VEHICLE SEAT

[75] Inventor: Vincent Bernard, Anould, France

[73] Assignee: Bertrand Faure Equipements S.A., Boulogne Cedex, France

[21] Appl. No.: 762,243

[22] Filed: Dec. 9, 1996

[30] Foreign Application Priority Data

Dec. 19, 1995 [FR] France .................................. 95 15857

[51] Int. Cl.⁶ ............................................................ B60N 2/20
[52] U.S. Cl. .................... 297/378.13; 70/218; 70/261; 292/DIG. 27; 292/DIG. 37; 296/65.1
[58] Field of Search ................... 297/378.13; 296/63, 296/65.1; 70/149, 218, 261, 472; 292/DIG. 27, DIG. 37

[56] References Cited

U.S. PATENT DOCUMENTS

| | | | |
|---|---|---|---|
| 3,121,580 | 2/1964 | Salvo et al. | 292/DIG. 27 X |
| 3,262,725 | 7/1966 | Ballantyne . | |
| 4,667,492 | 5/1987 | Tomatsu et al. | 297/378.13 X |
| 4,684,175 | 8/1987 | Trutter | 297/378.13 |
| 4,721,338 | 1/1988 | Kondo | 297/378.13 |
| 4,904,003 | 2/1990 | Yamazaki et al. | 297/378.13 X |

*Primary Examiner*—Peter R. Brown
*Attorney, Agent, or Firm*—Pollock, Vande Sande & Priddy

[57] ABSTRACT

A movable lock is provided with a spring return to normally maintain the lock in a lock position. A button acts on the lock by means of a push rod. A translation guide is provided for the rod. A locking securing means is connected to the guide means for completing transverse movement between a position where locking is possible wherein the end of the rod is located closely adjacent to the element of the lock; and a secured position wherein the rod end is spaced apart from the element.

11 Claims, 2 Drawing Sheets

SECURABLE LOCKING DEVICE FOR A MOVABLE ELEMENT OF AN AUTOMOBILE VEHICLE SEAT

FIELD OF THE INVENTION

This invention concerns a device for locking a movable element of an automobile vehicle seat onto a fixed element, such as locking the folding backrest of the rear seat in raised position.

BACKGROUND OF THE INVENTION

Folding down the backrest onto the seat especially enables objects larger than the boot of the vehicle to be loaded into the boot. We already know of fully or partially foldable backrests such as the backrests usually called "⅓–⅔".

Generally speaking, such locking devices must ensure automatic locking when the backrest is raised; unlocking being achieved by a control means such as a button.

Commonly known locking systems include a hook attached to the bodywork inside the boot and a movable spring-return locking element, installed on the backrest, which latches onto the hook when the backrest is raised. An unlocking control element, for example a button also installed on the backrest, enables the locking element to be disengaged from the hook, to unlock the backrest.

We also know of other locking systems which generally include an unlocking button acting on a movable locking element to place the latter in an unlocked position. These buttons are conventionally accessible from inside the passenger compartment of the vehicle. The result is that, even if the boot cannot be opened from the outside, it is accessible by a person who has entered the passenger compartment.

BRIEF DESCRIPTION OF THE INVENTION

The purpose of this invention is to prevent such access to the boot. It generally aims at preventing the unlocking of a locking device where the unlocking control means consist of a button, even when these control means are forced.

With these targets in mind, the subject of the invention is a device for locking a movable element of an automobile vehicle seat onto another element, where one of the elements includes a movable lock elastically returned into a locking position. Further included is an unlocking button equipped with a push rod extending in a movement direction and one end of which, away from the button, is shaped to act on a lock element to move the lock into an unlocked position, when the button is pressed. The invention further includes translation guide means for the rod and locking securing means connected to the guide means to move the guide means transversely between a first position where the end of the rod is located opposite the lock element, and in which unlocking is possible, and a second secured position where the said end of the rod is located beside the element.

In the first position where unlocking is possible, pressing the button transfers the action to the lock by means of the push rod. In the second secured position, the button can still be pressed, causing the push rod to move, but, in this case, the end of this rod passes beside the lock element and therefore has no effect on it. We have thus produced a securing system which does not inhibit the unlocking device to move, but eliminates its effect.

Because the lock itself is not inaccessible, as positioned, for example, inside the backrest of the seat, unlocking cannot be achieved, even by forcing the button, as all operations on the button remain without effect.

Other characteristics and advantages will appear in the description which will be given as an example of a device in compliance with the invention, used to unlock a folding backrest of the rear seat of an automobile vehicle.

Refer to the appended drawings on which:

DETAILED DESCRIPTION OF THE INVENTION

Figure 1:
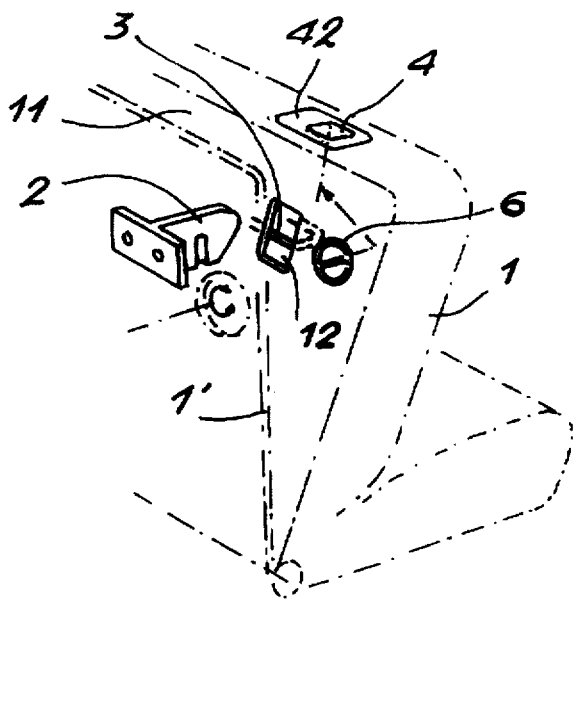
FIG. 1 shows a partial ¾ rear view of such a seat.

The drawing of FIG. 1 shows in dotted lines the seat and its folding backrest 1, and the locking component consisting here of a hook 2, attached, for example, to an inner wall of the boot of the vehicle. The backrest 1 is shown in a partially tipped position, therefore unlocked, the line 1' representing the position of the rear wall 11 of this backrest in the normal position, that is locked.

This wall 11 includes a window 12 behind which, in the thickness of the backrest, is placed a lock 3, and into which the hook 2 is inserted when the backrest is raised.

Figure 2:
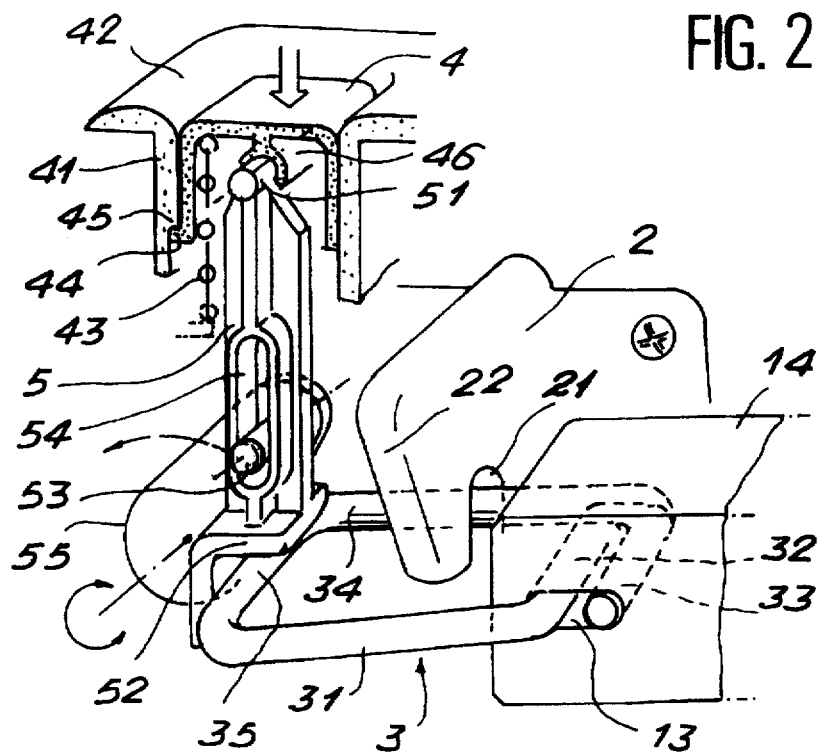
FIG. 2 shows a view of the locking device in position where unlocking is possible.

As we can see better on FIG. 2, this lock consists here of a metal wire formed into a ring 31, the ends 32, 33 of which are positioned parallel to each other and offset.

These ends 32, 33 are held in an oblong hole 13 of a support 14 attached to the backrest 1. One side 34 of the ring extends against the wall 11, through the window 12, and engages, in locked position, in a notch 21 of the hook, thus preventing the extraction of the said hook outside of the window.

As can be easily understood, pressing on the edge 35 of the ring opposite the said ends 32, 33 causes an elastic deformation of the ring and a downwards movement of the side 34 which disengages from the notch 21 in the hook to free the latter.

The front end 22 of the hook 2 is inclined to push the side 34 of the ring 31 downwards when the hook 2 is inserted in the window, to ensure automatic locking when this side 34 can return to its stable position, by the elastic return action of the ring, by entering the notch 21. For further details concerning a locking system of this type and its advantages, one can refer to the French patent application FR-A-2.720.985.

The unlocking control consists of a pushbutton 4 sliding in a guide well 41 and a cover 42 attached to the backrest 1 and placed on its upper edge. A return spring 43 pushes the button 4 upwards, substantially flush with the upper end of the well 41.

Figure 3:
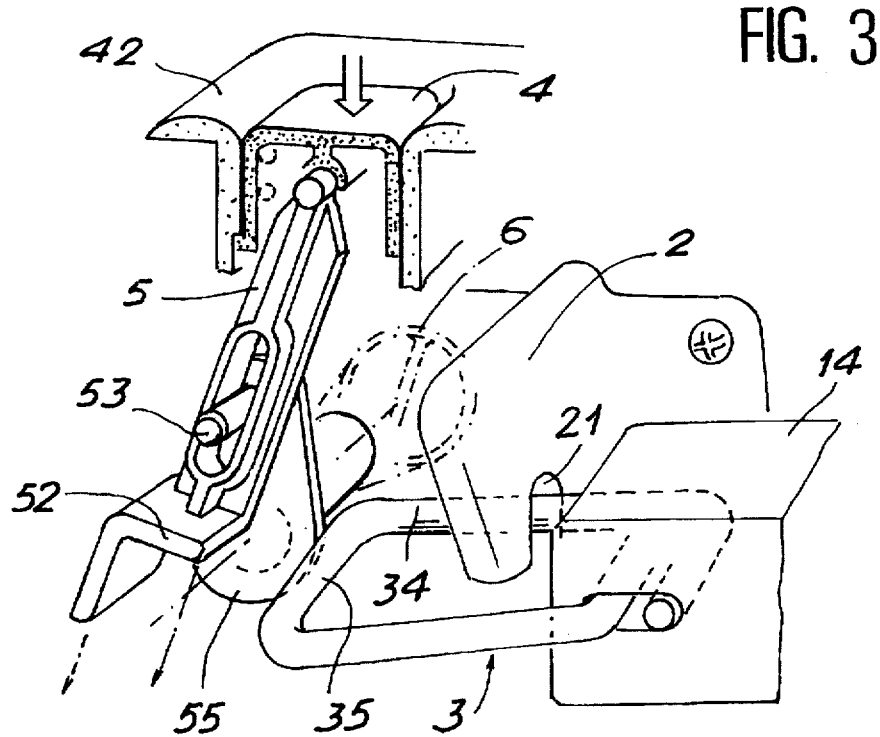
FIG. 3 shows a view corresponding to secured position.

Retention means, consisting, for example, of a collar 44 of the button bearing against a shoulder 45 of the well, limit the upward travel of the button and define a rest position, as shown on FIGS. 2 and 3, where the button is returned by the spring 43 when it is released.

A push rod 5 is installed so as to pivot on the button 4, by a hinge consisting of a cylinder 51 connected to one end of the rod and which snap fits into a receptacle 46 made in the button 4.

The rod 5 extends downwards, in the direction of the lock 3 and its lower end includes a plate 52 formed so as to bear on the edge 35 of the lock.

Guide means are provided to guide the rod 5, in its longitudinal direction, when it is moved by pressing the button. These guide means include, in the example shown, a pin 53, whose axis is parallel to the hinge axis of the rod on the button, this pin 53 being inserted in a longitudinal slot 54 of the rod. The pin 53 is attached to a lever 55 installed so as to pivot on the frame of the backrest and controlled in rotation by a securing knob 6 accessible on the rear wall 11 of the backrest.

In a position allowing unlocking, as shown on FIG. 2, the lever 55 is positioned so that the end plate 52 of the rod is located above the edge 35 of the lock. In this position, when button 4 is pressed, the action is transmitted by the rod 5 to the lock, and allows the unlocking of the hook 2.

By turning the lever 55, to place it in the locking secured position shown on FIG. 3, the pin 53 moves the rod 5 and the plate 52 is consequently offset laterally, beside the lock. In this position, pressing the button will cause the rod 5 to slide but the lock will not move.

Note that lock 3 is made so that it will be elastically returned into same position, whether it is engaged on the hook or not, this position being defined by the proper shape of the lock or by a stop, not shown, limiting its travel.

The relative positioning of the button and the lock and the length of the push rod are determined so that, play will exist between the plate 52 and the edge 35 of the lock, when the device is in the position where unlocking is possible and when the button and the lock are respectively against their respective stops. This play avoids all permanent stresses between the lock and the rod, and allows the lever and the rod to be moved from one position to another without hindrance, whether the backrest be locked or not. Thus, securing can be achieved by means of the knob 6, either when the backrest is raised and locked, by accessing the knob via the rear of the vehicle, or when the backrest is folded down, without the risk of a later relocking action inadvertently cancelling the securing action.

To eliminate all risks of unwanted movement of the lever 5 from the secured position, the lever 5 or the knob 6 will be preferentially equipped with a bistable spring in known manner, to ensure their stability in both secured and unsecured positions.

Figure 4:
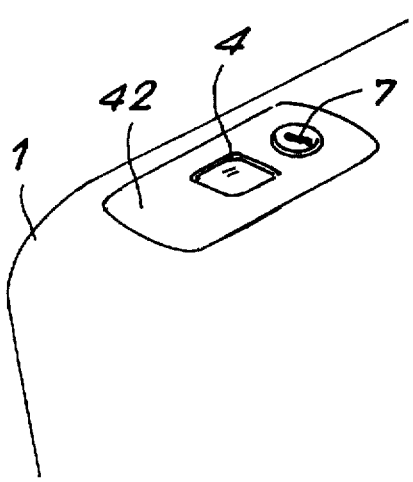
FIG. 4 shows the use on such a seat of a keyed lock securing device.
Figure 5:
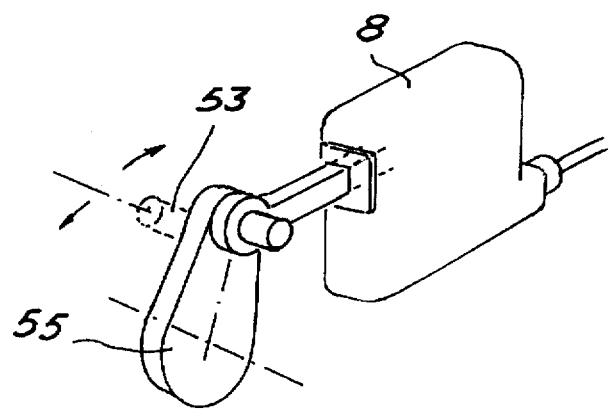
FIG. 5 shows the use on such a seat of an electrically actuated securing device.

Movement control of lever 5 can also be ensured by a keyed lock, shown on FIG. 4, accessible on the backrest beside the unlocking button, and connected to the lever, or by an electric actuator 8, shown on FIG. 5, integrated into the backrest, and allowing centralized securing of several locking devices installed in the vehicle.

The various securing control means can also be combined.

The push rod guide means and the means allowing the transverse movement of these guide means can also be modified. The securing system can also be used with locking systems other that the hook and spring ring systems described above and can be easily adapted by a man of the art to suit all locking systems using a button and a push rod as unlocking control means.

I claim:

1. Device for locking a movable element of an automobile vehicle seat onto another separate element, said movable elements comprising: a movable lock elastically returned into a locked position, and, an unlocking button equipped with a push rod extending in a movement direction; one end of the push rod, located away from the button, being shaped to act on a movable element of the lock for moving said lock to an unlocking position when the button is pressed; the device further including translation guide means for said rod; and locking securing means connected to said guide means to move the guide means transversely to said movement direction, between a) a first position where said end of the rod is located closely adjacent to said element of the lock, and in which unlocking is possible: and b) a secured position where said end of the rod is spaced apart from said element.

2. Device in accordance with claim 1, wherein the guide means include a pin inserted in a longitudinal slot of the rod.

3. Device in accordance with claim 2, wherein the securing means includes a pivoting lever operably attached to the guide means.

4. Device in accordance with claim 1, wherein the securing means includes a pivoting lever operably attached to the guide means.

5. Device in accordance with claim 1, wherein the rod is pivotally attached to the button.

6. Device in accordance with claim 1, wherein the device includes button stops means contacting the button and defining a rest position for said button, and a return spring to return the button to the rest position.

7. Device in accordance with claim 5, wherein when the button is in the rest position and the rod is in a position where unlocking is possible, play exists between the end of the rod and the movable element of the lock.

8. Device in accordance with claim 1, wherein the securing means include a knob with two stable positions.

9. Device in accordance with claim 1, wherein the securing means include an electric actuator to move the guide means.

10. Device in accordance with claim 1, wherein the securing means include a keyed lock.

11. The device of claim 1, together with a vehicle folding backrest for housing the movable elements.

* * * * *